US007202994B2

United States Patent
Okuno et al.

(10) Patent No.: US 7,202,994 B2
(45) Date of Patent: Apr. 10, 2007

(54) WAVELENGTH CONVERTER

(75) Inventors: Toshiaki Okuno, Yokohama (JP); Masaaki Hirano, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 120 days.

(21) Appl. No.: 10/804,174

(22) Filed: Mar. 19, 2004

(65) Prior Publication Data

US 2004/0234216 A1    Nov. 25, 2004

Related U.S. Application Data

(60) Provisional application No. 60/455,878, filed on Mar. 20, 2003, provisional application No. 60/493,348, filed on Aug. 8, 2003.

(51) Int. Cl.
*G02F 1/365* (2006.01)
(52) U.S. Cl. .................. 359/332; 385/122
(58) Field of Classification Search ........... 359/326, 359/332; 385/122
See application file for complete search history.

(56) References Cited

U.S. PATENT DOCUMENTS 4,852,968 A    8/1989   Reed
5,532,868 A *  7/1996   Gnauck et al. ............. 359/332
5,619,368 A *  4/1997   Swanson .................... 359/326
5,960,146 A    9/1999   Okuno et al.
6,043,927 A *  3/2000   Islam ........................ 359/332

FOREIGN PATENT DOCUMENTS

EP    1 209 497 A2    5/2002
JP    2003-177266 A    6/2003

OTHER PUBLICATIONS

Hiroshi, J. et al., "Dispersion slope controlled HNL-DSF with high γ of $25^{-1}km^{-1}$ and band conversion experiment using this fiber" Fitel Photonics laboratory, ECOC2002, Post-deadline session 1.
Okuno, T. et al., "Generation of Ultra-Broad-Band Supercontinuum by Dispersion-Flattened and Decreasing Fiber" IEEE Photonics Technology Letters, vol. 10, No. 1, Jan. 1998.
Hansen, K.P. et al., "Fully Dispersion Controlled Triangular-Core Nonlinear Photonic Crystal Fiber" OFC2003, Mar. 23-28, 2003, Postdeadline Papers.
Lee, J.H. et al., "Four-Wave Mixing Based 10-Gb/s Tunable Wavelength Conversion Using a Holey Fiber With a High SBS Threshold" IEEE Phototonics Technology Letters, vol. 15, No. 3, Mar. 2003.

(Continued)

*Primary Examiner*—John D. Lee
(74) *Attorney, Agent, or Firm*—McDermott Will & Emery LLP

(57) ABSTRACT

The present invention relates to a wavelength converter of structure enabling generation of converted light with high power even with a large difference between the wavelength of pumping light and the zero-dispersion wavelength. The wavelength converter includes an optical fiber having a dispersion slope whose absolute value at the wavelength of 1550 nm is 0.01 $ps/nm^2/km$ or less, for example.

16 Claims, 11 Drawing Sheets

| SAMPLE NO. | | Δ+ (%) | Δ- (%) | Ra (a/b) | 2a (μm) | TRANSMISSION LOSS (dB/km) | CHROMATIC DISPERSION (ps/nm/km) | DISPERSION SLOPE (ps/nm²/km) | CUTOFF WAVELENGTH (nm) | Aeff (μm²) | γ (1/W/km) | MFD (μm) | PMD (ps·km$^{-1/2}$) |
|---|---|---|---|---|---|---|---|---|---|---|---|---|---|
| 1 | | 1.37 | -0.82 | 0.52 | 4.890 | 0.48 | 0.063 | -0.0011 | 789 | 16.4 | 10.4 | 4.6 | 0.05 |
| 2 | | 1.37 | -0.82 | 0.52 | 4.908 | 0.48 | 0.525 | 0.0006 | 995 | 16.5 | 10.3 | 4.6 | 0.06 |
| 3 | | 1.37 | -0.82 | 0.52 | 4.860 | 0.47 | -0.771 | -0.0045 | 980 | 16.3 | 10.5 | 4.6 | 0.02 |
| 4 | | 1.37 | -0.82 | 0.52 | 4.892 | 0.51 | -0.077 | -0.0015 | 987 | 16.4 | 10.4 | 4.6 | 0.03 |
| 5 | AVERAGE | 1.37 | -0.82 | 0.52 | | 0.55 | 5.432 | 0.0168 | | | | | 0.01 |
| | A-TERMINAL | | | | 4.88 | | -0.2 | -0.002 | 987 | 16.4 | 10.4 | 4.6 | |
| | B-TERMINAL | | | | 5.36 | | 9.0 | 0.026 | 1084 | 17.4 | 9.8 | 4.8 | |
| 6 | | 1.30 | -0.75 | 0.55 | 5.288 | 0.43 | 0.31 | 0.001 | 948 | 18.2 | 9.1 | 4.9 | 0.03 |
| 7 | | 1.30 | -0.75 | 0.55 | 5.274 | 0.40 | -0.10 | -0.001 | 944 | 18.2 | 9.1 | 4.9 | 0.01 |

OTHER PUBLICATIONS

Inoue, K. "Arrangement of fiber pieces for a wide wavelength conversion range by fiber four-wave mixing" Aug. 15, 1994 / vol. 19, No. 16 / Optics Letters.

Onishi, M. et al., "Highly Nonlinear Dispersion-Shifted Fibers and Their Application to Broadband Wavelength Converter" Optical Fiber Technology, 4, 204-214 (1998), Article No. OF980248.

Inoue, K. "Tunable and Selective Wavelength Conversion Using Fiber Four-Wave Mixing with Two Pump Lights" IEEE Phototonics Technology Letters, vol. 6, No. 12, Dec. 1994.

Tanaka, K. et al., "400 Gbit/s (20×20 Gbit/s) dense WDM solution-based RZ signal transmission using dispersion flattened fibre" Electronic Letters, Nov. 12, 1998, vol. 34, No. 23.

"Low-Loss Quadruple-Clad Single-Mode Lightguides with Dispersion Below 2 ps/km nm over the 1•28 μm—1•65 μm Wavelength Range" Electronic Letters, Nov. 25, 1982, vol. 18, No. 24.

Liu Y. et al., "Design and Fabrication of Locally Dispersion-Flattened Large Effective Area Fibers" ECOC 98 Corning Incorporated, Sep. 1998.

Nakazawa M. et al., "TDM single channel 640 Gbit/s transmission experiment over 60km using 400fs pulse train and walk-off free, dispersion flattened nonlinear optical loop mirror" Electronic Letters, Apr. 30, 1998, vol. 34, No. 9.

Onishi, M. et al., "Highly Nonlinear Dispersion Shifted Fiber and its Application to Broadband Wavelength Converter" ECOC 97, Sep. 22-25, 1997, Conference Publication No. 448.

Watanabe, S. et al., "Simultaneous Wavelength Conversion and Optical Phase Conjugation of 200 Gb/s (5×40 Gb/s) WDM Signal Using a Highly Nonlinear Fiber Four-wave Mixer" ECOC 97, Sep. 22-25, 1997, Conference Publication No. 448.

Tsuzaki, T. et al., "Broadband Discrete Fiber Raman Amplifier with High Differential Gain Operating Over 1.65 μm-band" © 2000 Optical Society of America.

Okuno T. et al., "Silica-Based Functional Fibers with Enhanced Nonlinearity and Their Applications" *IEEE Journal of Selected Topics in Quantum Electronics* vol. 5, No. 5, Sep./Oct. 1999.

Batagelj B., "Conversion Efficiency of Fiber Wavelength Converter Based on Degenerate FWM" Transparent Optical Networks, 2nd Internation Conference on Gdansk, Poland, Jun. 5, 2000.

Headly, C. et al., "Methods of Suppressing Stimulated Brillouln Scattering in Optical Fibers by Manipulation of the Fiber Properties", *Technical Digest Symposium on Optical Fiber Measurements*, Oct. 1, 1996, pp. 105-110.

Okuno, Toshiaki., et al. "Generation of Ultra-Broad Band Supercontinuum by Dispersion-Flattened and Decreasing Fiber." IEEE Photonics Technology Letters, vol. 10, No. 1, Jan. 1998, pp. 72-74.

\* cited by examiner

Fig.2

| SAMPLE NO. | | Δ+ (%) | Δ- (%) | Ra (a/b) | 2a (μm) | TRANSMISSION LOSS (dB/km) | CHROMATIC DISPERSION (ps/nm/km) | DISPERSION SLOPE (ps/nm²/km) | CUTOFF WAVELENGTH (nm) | Aeff (μm²) | γ (1/W/km) | MFD (μm) | PMD (ps·km^(-1/2)) |
|---|---|---|---|---|---|---|---|---|---|---|---|---|---|
| 1 | | 1.37 | -0.82 | 0.52 | 4.890 | 0.48 | 0.063 | -0.0011 | 789 | 16.4 | 10.4 | 4.6 | 0.05 |
| 2 | | 1.37 | -0.82 | 0.52 | 4.908 | 0.48 | 0.525 | 0.0006 | 995 | 16.5 | 10.3 | 4.6 | 0.06 |
| 3 | | 1.37 | -0.82 | 0.52 | 4.860 | 0.47 | -0.771 | -0.0045 | 980 | 16.3 | 10.5 | 4.6 | 0.02 |
| 4 | | 1.37 | -0.82 | 0.52 | 4.892 | 0.51 | -0.077 | -0.0015 | 987 | 16.4 | 10.4 | 4.6 | 0.03 |
| 5 | AVERAGE | 1.37 | -0.82 | 0.52 | | 0.55 | 5.432 | 0.0168 | | | | | 0.01 |
| | A-TERMINAL | | | | 4.88 | | -0.2 | -0.002 | 987 | 16.4 | 10.4 | 4.6 | |
| | B-TERMINAL | | | | 5.36 | | 9.0 | 0.026 | 1084 | 17.4 | 9.8 | 4.8 | |
| 6 | | 1.30 | -0.75 | 0.55 | 5.288 | 0.43 | 0.31 | 0.001 | 948 | 18.2 | 9.1 | 4.9 | 0.03 |
| 7 | | 1.30 | -0.75 | 0.55 | 5.274 | 0.40 | -0.10 | -0.001 | 944 | 18.2 | 9.1 | 4.9 | 0.01 |

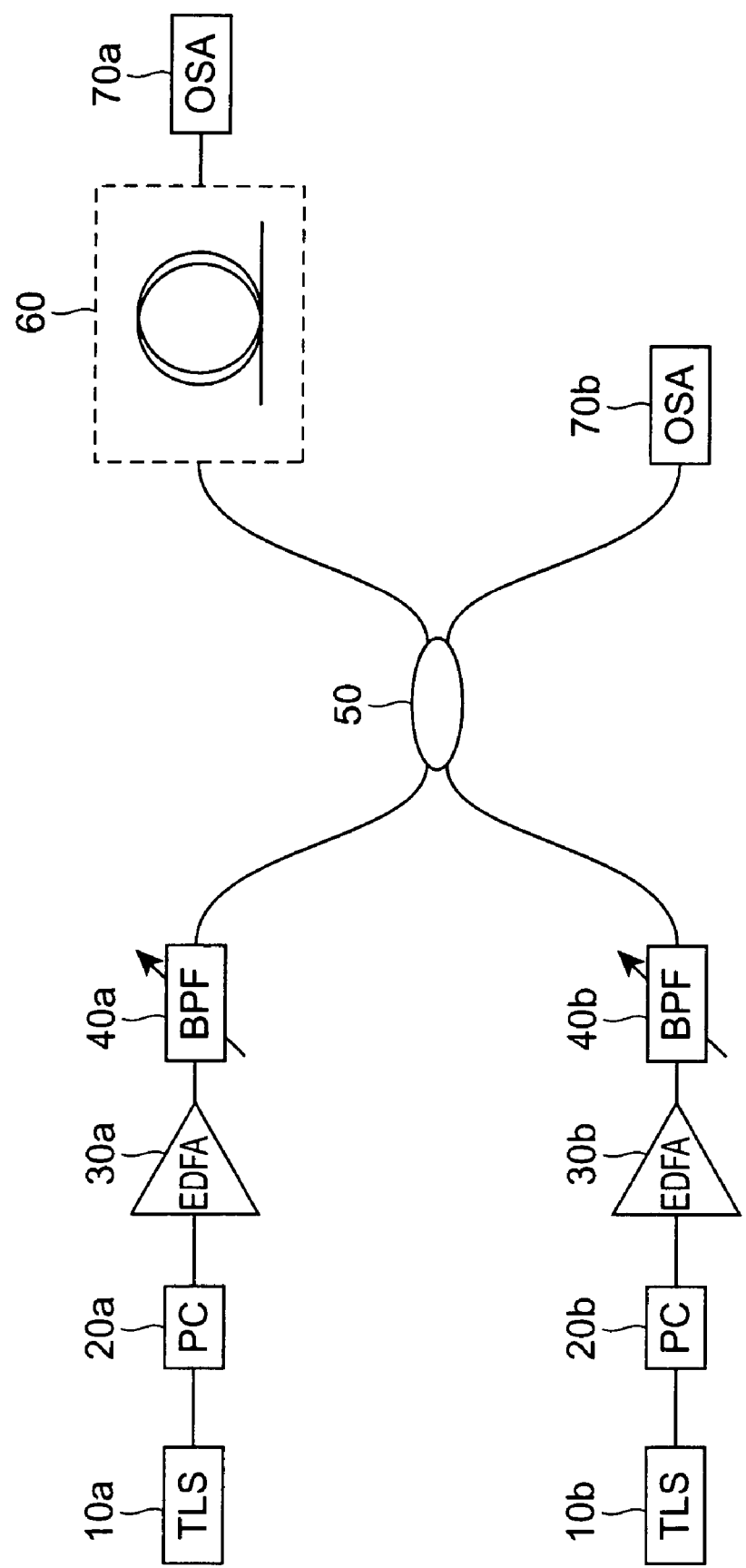

Fig.5

| SAMPLE NO. | LENGTH (m) | TRANSMISSION LOSS (dB/km) | CHROMATIC DISPERSION (ps/nm/km) | DISPERSION SLOPE (ps/nm²/km) | $\gamma$ (1/W/km) |
|---|---|---|---|---|---|
| 8 | 1000 | 0.47 | 0.42 | 0.0002 | 10.4 |
| 9 | 500 | 0.62 | 0.063 | -0.0011 | 10.4 |
| 10 | 1000 | 0.56 | -0.36 | 0.025 | 20.4 |
| 11 | 1000 | 0.22 | 0.32 | 0.0036 | 5.1 |
| 12 | 500 | >9.9 | -1 | 0.001 | 11.2 |

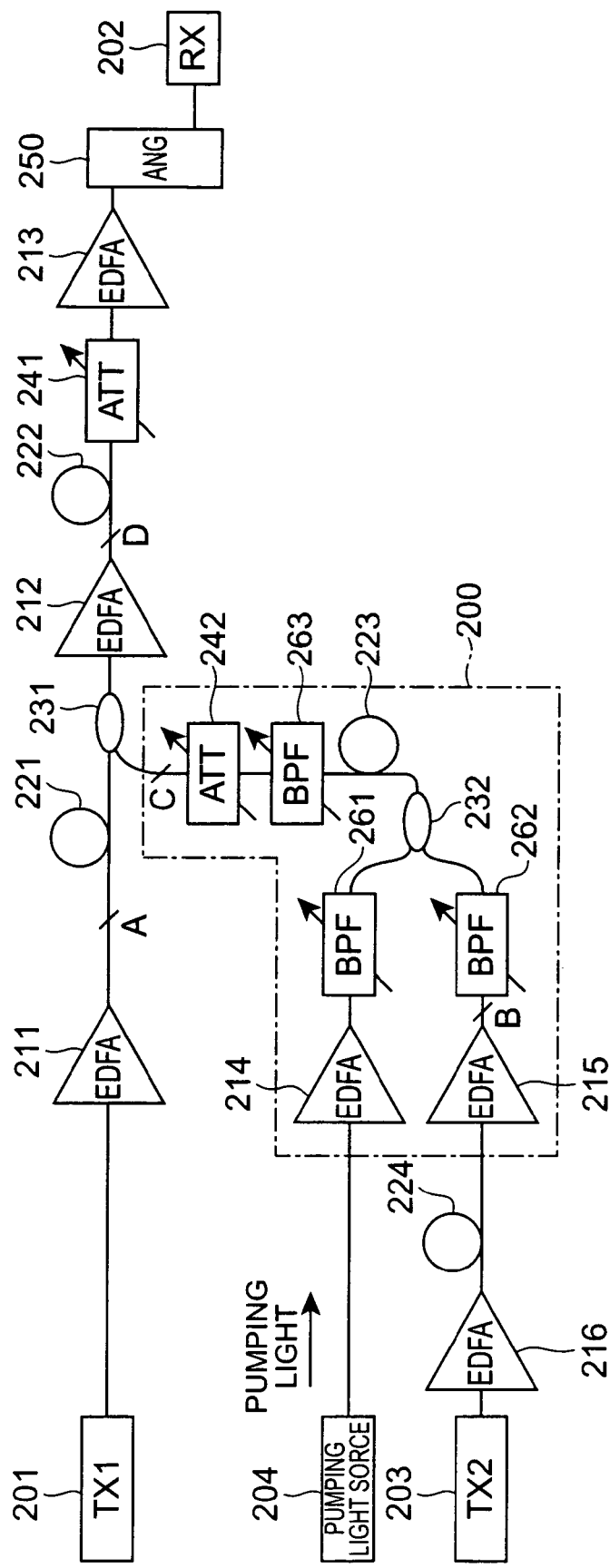
*Fig.10A*
*Fig.10C*
*Fig.10E*
*Fig.10B*
*Fig.10D*

WAVELENGTH CONVERTER

CROSS-REFERENCE TO RELATED APPLICATION

This application claims priorities to Provisional Application Ser. No. 60/455,878 filed on Mar. 20, 2003 and Provisional Application Ser. No. 60/493,348 filed on Aug. 8, 2003, which are hereby incorporated by reference in its entirety.

BACKGROUND OF THE INVENTION

1. Field of the Invention

The present invention relates to a wavelength converter for generating from input light of a first wavelength, converted light of a second wavelength by making use of a nonlinear optical phenomenon.

2. Related Background Art

It is known in general that during propagation of high-power light in media various nonlinear optical phenomena occur because of nonlinear polarization in the media. Among these nonlinear optical phenomena, Four-Wave Mixing (FWM) is caused by the third-order nonlinearity effect and, specifically, is a phenomenon in which input of three photons into a medium results in making a new photon. When the conservation of energy and the conservation of momentum both hold among the photons associated with the nonlinear optical phenomenon, the nonlinear optical phenomenon occurs at the highest efficiency.

Research has actively been made heretofore to positively cause the above-stated nonlinear optical phenomenon in an optical fiber and apply the optical fiber to wavelength conversion and others. For example, a wavelength converter is an optical device that generates from input light of a first wavelength, converted light of a second wavelength carrying the same information as the input light does. Such wavelength converters are applied, for example, to an optical communication network in which multiple nodes are mutually connected by an optical fiber transmission network, and they are provided in these nodes. A wavelength converter in a node operates to output converted light resulting from wavelength conversion from the wavelength of the incoming input light, as output light.

There are highly nonlinear fibers readily inducing the above-discussed nonlinear optical phenomenon inside; for example, Document 1 (Jiro Hiroishi, et al., "Dispersion slope controlled HNL-DSF with high γ of 25 W–1 km–1 and band conversion experiment using this fiber," ECOC 2002, PD1.5) discloses the high nonlinearity fiber with the reduced dispersion slope as small as 0.013 ps/nm²/km, and Document 2 (Toshiaki Okuno, et al., "Generation of Ultra-Broad-Band Supercontinuum by Dispersion-Flattened and Decreasing Fiber," IEEE PHOTONICS TECH. LETT., VOL. 10, NO. 1, January 1998, pp.72–74) discloses the highly nonlinear dispersion-flattened fiber. Document 3 (K. P. Hansen, et al., "Fully Dispersion Controlled Triangular-Core Nonlinear Photonic Crystal Fiber," OFC 2003, PD2) describes the dispersion-flattened highly nonlinear photonic crystal fiber with a short effective length because of large loss. Document 4 (Ju Han Lee, et al., "Four-Wave Mixing Based 10-Gb/s Tunable Wavelength Conversion Using a Holey Fiber With a High SBS Threshold," IEEE PHOTONICS TECH. LETT., VOL. 15, NO. 3, March 2003, pp.440–442) discloses the wavelength converter making use of the holey fiber, in which the permissible wavelength difference between signal light and pumping light is only about 10 nm, because of a large absolute value of chromatic dispersion. Document 5 (K. Inoue, "Arrangement of fiber pieces for a wide wavelength conversion range by fiber four-wave mixing," OPTICS LETTERS, VOL. 19, NO. 16, Aug. 15, 1994) discloses the technology of cascading a plurality of optical fibers with different zero-dispersion wavelengths and thereby expanding the bandwidth to about 2 THz, and Document 6 (M. Onishi, et al., "Highly Nonlinear Dispersion-Shifted Fibers and Their Application to Broadband Wavelength Converter," OPTICAL FIBER TECHNOLOGY, VOL. 4, 204–214 (1998) discloses examples of highly nonlinear fibers.

SUMMARY OF THE INVENTION

The Inventors conducted research on the above-described highly nonlinear fibers and found the following problem. Namely, the wavelength converters using the highly nonlinear fibers disclosed in above Documents 1–6 demonstrate a sudden drop of optical power of the converted light because the phase matching condition can not be met as the wavelength of the pumping light departs from the zero-dispersion wavelength of the optical fiber used. For this reason, it is difficult for these wavelength converters, which converts the wavelength of input signal light into a desired wavelength, to substantialize tunable wavelength conversion with pumping light of only one channel.

Document 7 (Kyo Inoue, "Tunable and Selective Wavelength Conversion Using Fiber Four-Wave Mixing with Two Pump Lights," IEEE PHOTONICS TECH. LETT., VOL. 6, NO. 12, December 1994) presented the wavelength converter configured to supply pumping light of two channels into the optical fiber. However, it also experiences a drop of optical power of the converted light as the channel wavelengths of the pumping light depart from the zero-dispersion wavelength of the optical fiber. First of all, the supply of the pumping light of two channels is a cause to raise the production cost of the wavelength converter. It is thus difficult for even the wavelength converter described in above Document 7 to implement efficient wavelength conversion throughout a broader band.

The present invention has been accomplished in order to solve the problem described above, and an object of the present invention is to provide a wavelength converter of structure enabling generation of converted light with high power even if there is a large difference between the wavelength of pumping light and the zero-dispersion wavelength.

A wavelength converter according to the present invention is a wavelength converter using an optical fiber, which implements wavelength conversion from input light of a first wavelength by a nonlinear optical phenomenon to generate converted light of a second wavelength different from the first wavelength.

The optical fiber applied to the wavelength converter according to the present invention preferably has a dispersion slope whose absolute value at the wavelength of 1550 nm is 0.01 ps/nm²/km or less. In this case, the wavelength converter can generate the converted light with high power even if the difference between the wavelength of the input light launched into the optical fiber and the zero-dispersion wavelength of the optical fiber, i.e., Detuning, becomes large.

The optical fiber applied to the wavelength converter according to the present invention may have the dispersion slope whose absolute value at the wavelength of the pumping light supplied is 0.01 ps/nm²/km or less. The reason is that in the wavelength converter utilizing the pumping light, the converted light can be taken out more efficiently when the optical fiber through which the pumping light propagates has a sufficiently small dispersion slope. Particularly, when the optical fiber has the small dispersion slope for the pumping light with high optical power, the wavelength converter can generate the converted light with high power even if the difference between the wavelength of the pumping light and the zero-dispersion wavelength of the optical fiber, i.e., Detuning, becomes large.

The optical fiber applied to the wavelength converter according to the present invention may have a chromatic dispersion whose absolute value at least in the wavelength range of 1530 nm to 1565 nm is 0.2 ps/nm/km or less. When the chromatic dispersion of the optical fiber is adequately controlled in the range of C-band, it becomes feasible to implement wavelength conversion in a broader band. Since in this wavelength band the optical power of resultant converted light varies little even with variation in the wavelength of the pumping light, the converted light is generated with high optical power in a broader band.

The optical fiber applied to the wavelength converter according to the present invention preferably has at least two zero-dispersion wavelengths in the wavelength range of 1300 nm to 1700 nm. When the optical fiber is designed to have two or more zero-dispersion wavelengths, it is feasible to expand the wavelength range where the absolute value of chromatic dispersion is small. As a consequence, it becomes feasible to induce four-wave mixing efficiently throughout a broader wavelength band.

Another wavelength converter according to the present invention implements wavelength conversion from pumping light of at least one pumping channel and signal light of at least one signal channel by a nonlinear optical phenomenon to generate converted light of at least one channel. In this case, preferably, the wavelength converter comprises a pumping light source in which a wavelength of a pumping channel is tunable, and an optical fiber having a dispersion slope whose absolute value at the wavelength of the pumping light supplied from the pumping light source is 0.01 ps/nm$^2$/km or less. The reason is that in the configuration of launching the pumping light and the signal light, the converted light can be generated more efficiently when the optical fiber has a small dispersion slope at the wavelength of the pumping light. Particularly, when the optical fiber has the small dispersion slope for the pumping light with high optical power, the wavelength converter can generate the converted light with high power even if the difference between the wavelength of the pumping light and the zero-dispersion wavelength of the optical fiber, i.e., Detuning, becomes large.

The optical fiber of the structure as described above, preferably, has a nonlinear coefficient of 8 (1/W/km) or more and, further preferably, a nonlinear coefficient of 10 (1/W/km) or more. When the nonlinear coefficient is not less than the value as defined, the converted light can be generated efficiently by practical input light power. In addition, the converted light is obtained in a sufficiently broad band and with high power even if the fiber length is shortened by 1 km or less.

Furthermore, the above optical fiber preferably has a transmission loss of 1 dB/km or less at the wavelength of 1550 nm. The reason is that the low transmission loss permits the effective fiber length to the nonlinear optical phenomenon to be sufficiently long and that the converted light is obtained with higher power. In other words, the effective fiber length of the optical fiber can be maintained sufficiently long, so that the high-power converted light is generated.

In the above optical fiber, preferably, a threshold for occurrence of stimulated Brillouin scattering for the input pumping light is 10 dBm or more. The reason is that the threshold of 10 dBm or more is enough to avoid decrease of the effective fiber length to the nonlinear optical phenomenon and that the input pumping light can be sufficiently allocated to the converted light. Namely, when the threshold is 10 dBm or more, the converted light is generated with practically applicable, high power.

Furthermore, in the wavelength converter according to the present invention, a permissive tunable width of the wavelength of the converted light outputted from the above optical fiber is 20 nm or more. When the wavelength of input signal light can be tunable in the wavelength range of 20 nm or more, the wavelength converter according to the present invention can be applied to actual optical networks at practical level.

In the wavelength converter according to the present invention, the converted light outputted from the optical fiber preferably has a permissive tunable width of 20 nm or more for the signal channel at least in the wavelength range of 1530 nm to 1565 nm (C-band). The reason is that adequately practical wavelength conversion can be substantialized in the C-band. Namely, it becomes feasible to implement the conversion into an arbitrary wavelength, independent of the wavelength of the signal light.

The wavelength converter according to the present invention preferably further comprises an optical component for blocking the pumping light having propagated in the optical fiber. This optical component is disposed on the optical output end side of the optical fiber. This optical component prevents the pumping light with high power, which is outputted from the optical fiber, from affecting the transmission system of rear stage.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a table showing a list of specifications of Samples (No. 1 to No. 7) made as trial samples of the highly nonlinear dispersion-flattened fiber shown in FIGS. 1A and 1B;

FIG. 4 is an illustration showing a configuration of an evaluation system for optical fiber samples applied to the wavelength converter according to the present invention;

FIG. 5 is a table showing a list of specifications of Samples (No. 8, No. 9) and comparative fiber made as trial samples of objects for evaluation in the evaluation system shown in FIG. 4;

FIGS. 10A to 10E are diagrams showing a configuration of a first embodiment of an optical communication system to which the wavelength converter according to the present invention is applied.

DETAILED DESCRIPTION OF THE PREFERRED EMBODIMENTS

Embodiments of the wavelength converter according to the present invention will be described below in detail with FIGS. 1A, 1B, 2, 3A, 3B, 4–9, and 10A–11E. The same elements will be denoted by the same reference symbols throughout the description of the drawings, without redundant description thereof.

Figure 1A:
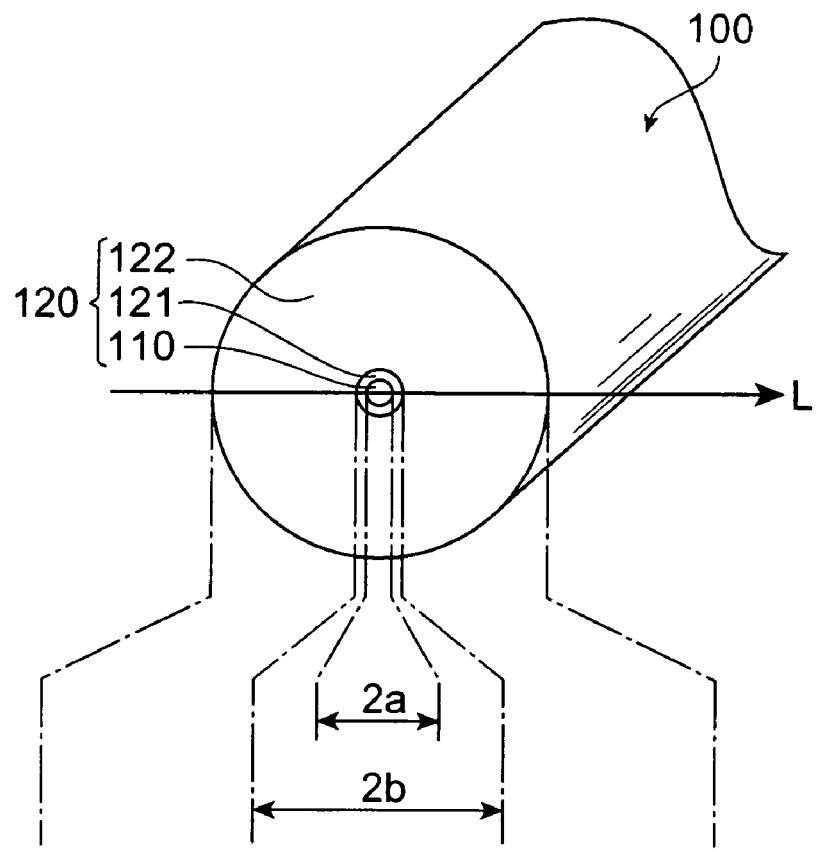
FIGS. 1A and 1B are a sectional view showing a structure of a highly nonlinear dispersion-flattened fiber suitable for the wavelength converter according to the present invention, and an index profile thereof.
Figure 1B:
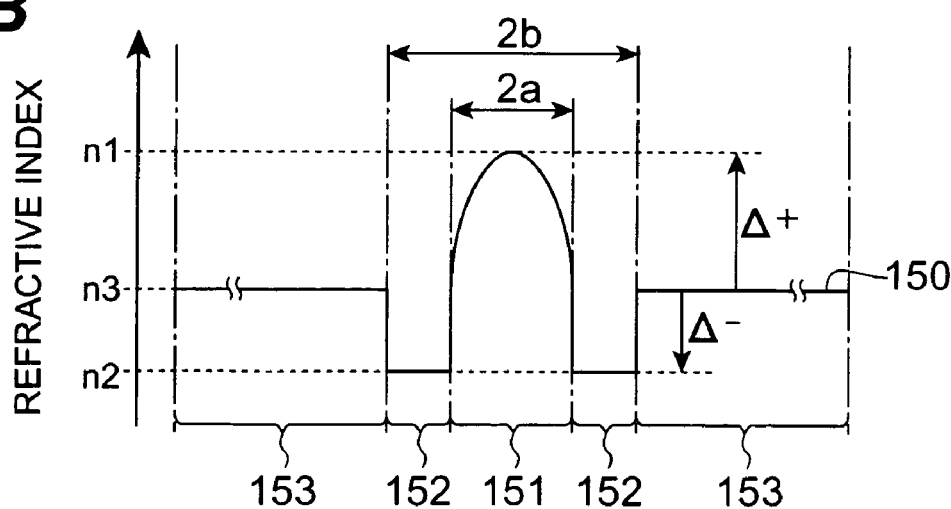

First, the structure of the optical fiber suitable for the wavelength converter according to the present invention will be described. FIGS. 1A and 1B are a sectional view showing a structure of a Highly Nonlinear Dispersion Flattened Fiber (HNL-DFF) as an optical fiber suitable for the wavelength converter, and an index profile thereof.

In FIG. 1A, the optical fiber 100 is comprised of core region 110 with refractive index n1 extending along a predetermined axis and having outer diameter 2a, and cladding region 120 provided on the outer periphery of the core region 110. This cladding region 120 is comprised of an inner cladding 121 with refractive index n2 (<n1) provided on the outer periphery of core region 110 and having outer diameter 2b, and outer cladding 122 with refractive index n3 (<n1 and >n2) provided on the outer periphery of the inner cladding 121.

When a reference region is the outer cladding 122 being the outermost layer of the cladding region 120, relative refractive index difference $\Delta^+$ of the core region 110 and relative refractive index difference $\Delta^-$ of the inner cladding 121 with respect to the outer cladding 122 are given by the following expressions respectively.

$$\Delta^+ \approx (n1-n3)/n1 \times 100$$

$$\Delta^- \approx (n2-n3)/n2 \times 100$$

FIG. 1B shows index profile 150 of the optical fiber 100 shown in FIG. 1A. In this index profile 150, area 151 indicates the refractive index of each part on line L in the core region 110, area 152 the refractive index of each part on line L in the inner cladding 121, and area 153 the refractive index of each part on line L in the outer cladding 122. The optical fiber 100 described above contains, for example, the principal component of silica glass, the core region 110 is doped with $GeO_2$, and the inner cladding 121 is doped with fluorine. The outer cladding 122 is comprised of silica glass made of pure silica and doped with chlorine.

Figure 3A:
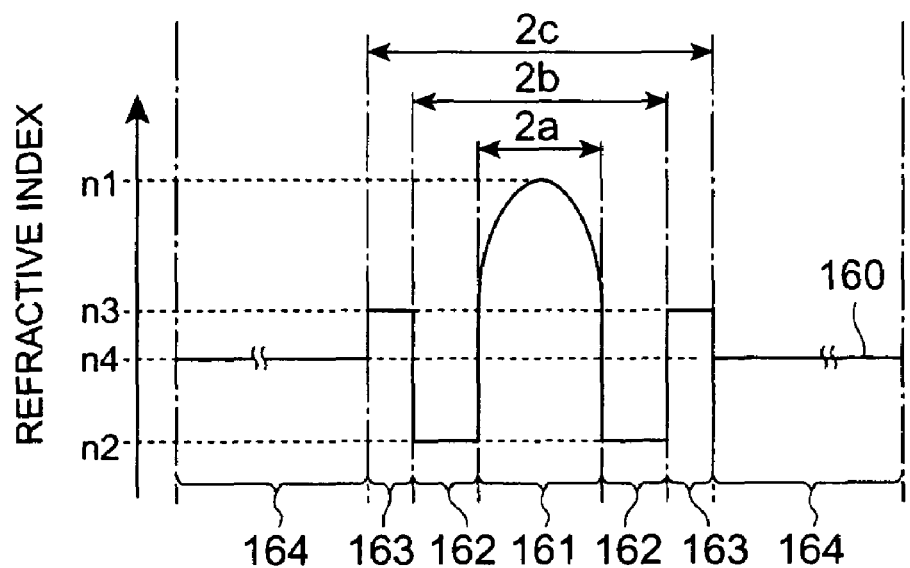
FIGS. 3A and 3B are other index profiles of highly nonlinear dispersion-flattened fibers suitable for the wavelength converter according to the present invention.
Figure 3B:
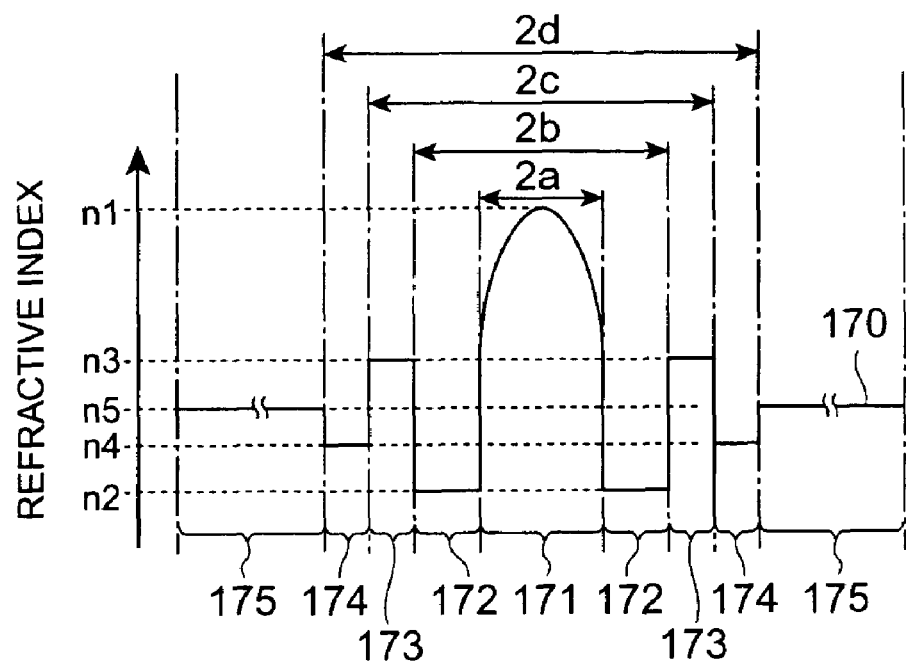

The optical fiber suitable for the wavelength converter according to the present invention may have any of various index profiles 160, 170, as shown in FIGS. 3A and 3B. The index profile 160 shown in FIG. 3A is substantialized by disposing an intermediate cladding between inner cladding 121 and outer cladding 122 of optical fiber 100 shown in FIGS. 1A and 1B. Namely, in this index profile 160, area 161 indicates the refractive index of the core region having refractive index n1 and outer diameter 2a; area 162 the refractive index of the inner cladding provided on the outer periphery of the core region and having refractive index n2 (<n1) and outer diameter 2b; area 163 the refractive index of the intermediate cladding provided on the outer periphery of the inner cladding and having refractive index n3 (>n2 and <n1) and outer diameter 2c; and area 164 the refractive index of the outer cladding provided on the outer periphery of the intermediate cladding and having refractive index n4 (<n3 and >n2).

Furthermore, the index profile 170 shown in FIG. 3B is substantialized by providing two intermediate cladding layers between inner cladding 121 and outer cladding 122 of the optical fiber 100 shown in FIGS. 1A and 1B. Namely, in this index profile 170, area 171 indicates the refractive index of the core region having refractive index n1 and outer diameter 2a; area 172 the refractive index of the inner cladding provided on the outer periphery of the core region and having refractive index n2 (<n1) and outer diameter 2b; area 173 the refractive index of the first intermediate cladding provided on the outer periphery of the inner cladding and having refractive index n3 (>n2 and <n1) and outer diameter 2c; area 174 the refractive index of the second intermediate cladding provided on the outer periphery of the first intermediate cladding and having refractive index n4 (>n2 and <n3) and outer diameter 2d; and area 175 the refractive index of the outer cladding provided on the outer periphery of the second intermediate cladding and having refractive index n5 (<n3 and >n4).

Each of Examples of the highly nonlinear dispersion flattened fiber suitable for the wavelength converter according to the present invention will be described below. FIG. 2 is a table presenting a list of specifications of Samples (No. 1 to No. 7) experimentally made as samples of the highly nonlinear dispersion flattened fiber shown in FIGS. 1A and 1B. These optical fibers of Samples No. 1 to No. 7 all have the sectional structure and index profile shown in FIGS. 1A and 1B.

(Sample No. 1)

In the optical fiber of Sample No. 1, the core region has the relative refractive index difference $\Delta^+$ of 1.37% with respect to the outer cladding as a reference region, and the inner cladding has the relative refractive index difference $\Delta^-$ of −0.82% with respect to the outer cladding. The parameter α for determining the profile shape of the core region is 3.0. The outer diameter 2a of the core region is 4.890 μm and the ratio Ra (=a/b) of the outer diameter 2a of the core region to the outer diameter 2b of the inner cladding is 0.52. This optical fiber of Sample No. 1 has the following properties at the wavelength of 1550 nm: the transmission loss of 0.48 dB/km, the chromatic dispersion of 0.063 ps/nm/km, and the dispersion slope of −0.0011 ps/nm²/km. The cutoff wavelength is 989 nm. Furthermore, the optical fiber of Sample No. 1 also has the following properties at the wavelength of 1550 nm: the effective area $A_{eff}$ of 16.4 µm², the nonlinear coefficient γ of 10.4 (1/W/km), the mode field diameter MFD of 4.6 µm, and the polarization mode dispersion PMD of 0.05 ps·km$^{-1/2}$.

(Sample No. 2)

In the optical fiber of Sample No. 2, the core region has the relative refractive index difference $\Delta^+$ of 1.37% with respect to the outer cladding as a reference region, and the inner cladding has the relative refractive index difference $\Delta^-$ of −0.82% with respect to the outer cladding. The parameter α for determining the profile shape of the core region is 3.0. The outer diameter 2a of the core region is 4.908 µm and the ratio Ra (=a/b) of the outer diameter 2a of the core region to the outer diameter 2b of the inner cladding is 0.52. This optical fiber of Sample No. 2 has the following properties at the wavelength of 1550 nm: the transmission loss of 0.48 dB/km, the chromatic dispersion of 0.525 ps/nm/km, and the dispersion slope of 0.0006 ps/nm²/km. The cutoff wavelength is 995 nm. Furthermore, the optical fiber of Sample No. 2 also has the following properties at the wavelength of 1550 nm: the effective area $A_{eff}$ of 16.5 µm², the nonlinear coefficient γ of 10.3 (1/W/km), the mode field diameter MFD of 4.6 µm, and the polarization mode dispersion PMD of 0.06 ps·km$^{-1/2}$.

(Sample No. 3)

In the optical fiber of Sample No. 3, the core region has the relative refractive index difference $\Delta^+$ of 1.37% with respect to the outer cladding as a reference region, and the inner cladding has the relative refractive index difference $\Delta^-$ of −0.82% with respect to the outer cladding. The parameter α for determining the profile shape of the core region is 3.0. The outer diameter 2a of the core region is 4.860 µm and the ratio Ra (=a/b) of the outer diameter 2a of the core region to the outer diameter 2b of the inner cladding is 0.52. This optical fiber of Sample No. 3 has the following properties at the wavelength of 1550 nm: the transmission loss of 0.47 dB/km, the chromatic dispersion of −0.771 ps/nm/km, and the dispersion slope of −0.0045 ps/nm²/km. The cutoff wavelength is 980 nm. Furthermore, the optical fiber of Sample No. 3 also has the following properties at the wavelength of 1550 nm: the effective area $A_{eff}$ of 16.3 µm², the nonlinear coefficient γ of 10.5 (1/W/km), the mode field diameter MFD of 4.6 µm, and the polarization mode dispersion PMD of 0.02 ps·km$^{-1/2}$.

(Sample No. 4)

In the optical fiber of Sample No. 4, the core region has the relative refractive index difference $\Delta^+$ of 1.37% with respect to the outer cladding as a reference region, and the inner cladding has the relative refractive index difference $\Delta^-$ of −0.82% with respect to the outer cladding. The parameter α for determining the profile shape of the core region is 3.0. The outer diameter 2a of the core region is 4.892 µm and the ratio Ra (=a/b) of the outer diameter 2a of the core region to the outer diameter 2b of the inner cladding is 0.52. This optical fiber of Sample No. 4 has the following properties at the wavelength of 1550 nm: the transmission loss of 0.51 dB/km, the chromatic dispersion of −0.097 ps/nm/km, and the dispersion slope of −0.0015 ps/nm²/km. The cutoff wavelength is 987 nm. Furthermore, the optical fiber of Sample No. 4 has the following properties at the wavelength of 1550 nm: the effective area $A_{eff}$ of 16.4 µm², the nonlinear coefficient γ of 10.4 (1/W/km), the mode field diameter MFD of 4.6 µm, and the polarization mode dispersion PMD of 0.03 ps·km$^{-1/2}$.

(Sample No. 5)

The optical fiber of Sample No. 5 is a Dispersion Managed Fiber (DMF) in which the chromatic dispersion changes along the longitudinal direction from one terminal (A-terminal) toward the other terminal (B-terminal). In this optical fiber of Sample No. 5, the core region has the relative refractive index difference $\Delta^+$ of 1.37% with respect to the outer cladding as a reference area, and the inner cladding has the relative refractive index difference $\Delta^-$ of −0.82% with respect to the outer cladding. The parameter α for determining the profile shape of the core region is 3.0. The outer diameter 2a of the core region is 4.88 µm on the A-terminal side and 5.36 µm on the B-terminal side. The ratio Ra (=a/b) of the outer diameter 2a of the core region to the outer diameter 2b of the inner cladding is 0.52. This optical fiber of Sample No. 5 has the following properties at the wavelength of 1550 nm; the average transmission loss of 0.55 dB/km, the average chromatic dispersion of 5.432 ps/nm/km, and the average dispersion slope of 0.0168 ps/nm²/km. The chromatic dispersion and the dispersion slope on the A-terminal side are −0.2 ps/nm/km and −0.002 ps/nm²/km, respectively. On the other hand, the chromatic dispersion and the dispersion slope on the B-terminal side are 9.0 ps/nm/km and 0.026 ps/nm²/km, respectively. The cutoff wavelength is 987 nm on the A-terminal side and 1084 nm on the B-terminal side. Furthermore, the optical fiber of Sample No. 5 has the average polarization mode dispersion PMD of 0.05 ps·km$^{-1/2}$ as a property at the wavelength 1550 nm. The effective area $A_{eff}$ on the A-terminal side is 16.4 µm² and the effective area $A_{eff}$ on the B-terminal side 17.4 µm². The nonlinear coefficient γ on the A-terminal side is 10.4 (1/W/km) and the nonlinear coefficient γ on the B-terminal side 9.8 (1/W/km). Furthermore, the mode field diameter MFD on the A-terminal side is 4.6 µm, and the mode field diameter MFD on the B-terminal side 4.8 µm.

(Sample No. 6)

In the optical fiber of Sample No. 6, the core region has the relative refractive index difference $\Delta^+$ of 1.30% with respect to the outer cladding as a reference region, and the inner cladding has the relative refractive index difference $\Delta^-$ of −0.75% with respect to the outer cladding. The parameter α for determining the profile shape of the core region is 2.8. The outer diameter 2a of the core region is 5.288 µm and the ratio Ra (=a/b) of the outer diameter 2a of the core region to the outer diameter 2b of the inner cladding is 0.55. This optical fiber of Sample No. 6 has the following properties at the wavelength of 1550 nm: the transmission loss of 0.43 dB/km, the chromatic dispersion of 0.31 ps/nm/km, and the dispersion slope of 0.001 ps/nm²/km. The cutoff wavelength is 948 nm. Furthermore, the optical fiber of Sample No. 6 also has the following properties at the wavelength of 1550 nm: the effective area $A_{eff}$ of 18.2 µm², the nonlinear coefficient γ of 9.1 (1/W/km), the mode field diameter MFD of 4.9 µm, and the polarization mode dispersion PMD of 0.03 ps·km$^{-1/2}$.

(Sample No. 7)

In the optical fiber of Sample No. 7, the core region has the relative refractive index difference $\Delta^+$ of 1.30% with respect to the outer cladding being the reference region, and the inner cladding the relative refractive index difference $\Delta^-$ of −0.75% with respect to the outer cladding. The parameter α for determining the profile shape of the core region is 2.8.

The outer diameter 2a of the core region is 5.274 μm and the ratio Ra (=a/b) of the outer diameter 2a of the core region to the outer diameter 2b of the inner cladding is 0.55. This optical fiber of Sample No. 7 has the following properties at the wavelength of 1550 nm: the transmission loss of 0.40 dB/km, the chromatic dispersion of −0.10 ps/nm/km, and the dispersion slope of −0.001 ps/nm²/km. The cutoff wavelength is 944 nm. Furthermore, the optical fiber of Sample No. 7 also has the following properties at the wavelength of 1550 nm: the effective area $A_{eff}$ of 18.2 μm², the nonlinear coefficient γ of 9.1 (1/W/km), the mode field diameter MFD of 4.9 μm, and the polarization mode dispersion PMD of 0.01 ps·km$^{-1/2}$.

As apparent from the above examples, the optical fibers suitable for the wavelength converter according to the present invention have the following properties at the wavelength of 1550 nm: the chromatic dispersion whose absolute value is 2 ps/nm/km or less; the dispersion slope whose absolute value is 0.01 ps/nm²/km or less; and the nonlinear coefficient γ of 8 (1/W/km) or more, preferably, 10 (1/W/km) or more. The dispersion management fiber preferably has the following properties on the A-terminal side: the chromatic dispersion in the range of +4 to +15 ps/nm/km, the dispersion slope whose absolute value is 0.04 ps/nm²/km or less, and the nonlinear coefficient γ of 8 (1/W/km) or more; and the following properties on the B-terminal side: the chromatic dispersion in the range of +2 to −2 ps/nm/km, the dispersion slope whose absolute value is 0.01 ps/nm²/km or less, and the nonlinear coefficient γ of 8 (1/W/km) or more. Furthermore, preferably, the effective area $A_{eff}$ is 20 μm² or less and further preferably 17 μm² or less, the polarization mode dispersion PMD is 0.3 ps·km$^{-1/2}$ or less, and the transmission loss is 1.0 dB/km or less.

In order to obtain the preferred index profile shape, preferably, the core region has the relative refractive index difference $\Delta^+$ of 1.2% or more and the inner cladding has the relative refractive index difference $\Delta^-$ of −0.6% or less with reference to the outer cladding. Preferably, the parameter α in approximation of the index profile of the core region by power distribution is 2 or more, and the ratio Ra (=a/b) of the outer diameter 2a of the core region to the outer diameter 2b of the inner cladding is 0.30–0.70.

Subsequently, the superiority of the highly nonlinear dispersion flattened fiber (HNL-DFF) suitable for the wavelength converter according to the present invention will be examined in comparison with conventional highly nonlinear fibers (HNLFs). FIG. 4 is a diagram showing a configuration of an evaluation system for the optical fiber samples applied to the wavelength converter according to the present invention.

The evaluation system shown in this FIG. 4 is provided with 2 input-2 output 3 dB optical coupler 50. A Tunable Laser Source (TLS) 10a for supplying probe light is optically coupled to a first input end of the optical coupler 50, and there are Polarization Controller (PC) 20a, Er-Doped Fiber Amplifier (EDFA) 30b, and Band Pass Filter (BPF) 40b placed between the optical coupler 50 and TLS 10a. On the other hand, TLS 10b for supplying pumping light is optically coupled to a second input end of the optical coupler 50, and there are PC 20b, EDFA 30b, and BPF 40b placed between the optical coupler 50 and TLS 10b.

Optical Spectrum Analyzers (OSAs) 70a, 70b are placed at a first output end and at a second output end, respectively, of the optical coupler 50, and an evaluation object fiber 60 is placed between the first output end of the optical coupler 50 and OSA 70a, whereby the OSA 70a is arranged to monitor output of the evaluation object fiber 60.

FIG. 5 is a table presenting a list of specifications of Samples (No. 8, No. 9) and comparative fiber experimentally made as objects for evaluation in the evaluation system shown in FIG. 4. The optical fibers of Samples No. 8 and No. 9 are Highly Nonlinear Dispersion-Flattened Fibers (HNL-DFFs) suitable for the wavelength converter according to the present invention, the optical fiber of Sample No. 10 is a conventional Highly Nonlinear Fiber (HNLF), Sample No. 11 a Dispersion-Flattened Fiber (DFF) disclosed in nonpatent Document 2, and Sample 12 a Highly Nonlinear Dispersion-Flattened Photonic Crystal Fiber (HNL-DFPCF) disclosed in nonpatent Document 3.

(Sample No. 8)

The HNL-DFF of Sample No. 8 has the length of 1000 m and the following properties at the wavelength of 1550 nm: the transmission loss of 0.47 dB/km, the chromatic dispersion of 0.42 ps/nm/km, the dispersion slope of 0.0002 ps/nm²/km, and the nonlinear coefficient γ of 10.4 (1/W/km).

(Sample No. 9)

The HNL-DFF of Sample No. 9 has the length of 500 m and the following properties at the wavelength of 1550 nm: the transmission loss of 0.62 dB/km, the chromatic dispersion of 0.063 ps/nm/km, the dispersion slope of −0.0011 ps/nm²/km, and the nonlinear coefficient γ of 10.4 (1/W/km).

(Sample No. 10)

The HNLF of Sample No. 10 has the length of 1000 m and the following properties at the wavelength of 1550 nm: the transmission loss of 0.56 dB/km, the chromatic dispersion of −0.36 ps/nm/km, the dispersion slope of 0.025 ps/nm²/km, and the nonlinear coefficient γ of 20.4 (1/W/km).

(Sample No. 11)

The DFF of Sample No. 11 has the length of 1000 m and the following properties at the wavelength of 1550 nm: the transmission loss of 0.22 dB/km, the chromatic dispersion of 0.32 ps/nm/km, the dispersion slope of 0.0036 ps/nm²/km, and the nonlinear coefficient γ of 5.1 (1/W/km).

(Sample No. 12)

The PCF of Sample No. 12 has the length of 500 m and the following properties at the wavelength of 1550 nm: the transmission loss of more than 9.9 dB/km, the chromatic dispersion of −1 ps/nm/km, the dispersion slope of 0.001 ps/nm²/km, and the nonlinear coefficient γ of 11.2 (1/W/km).

Figure 6:
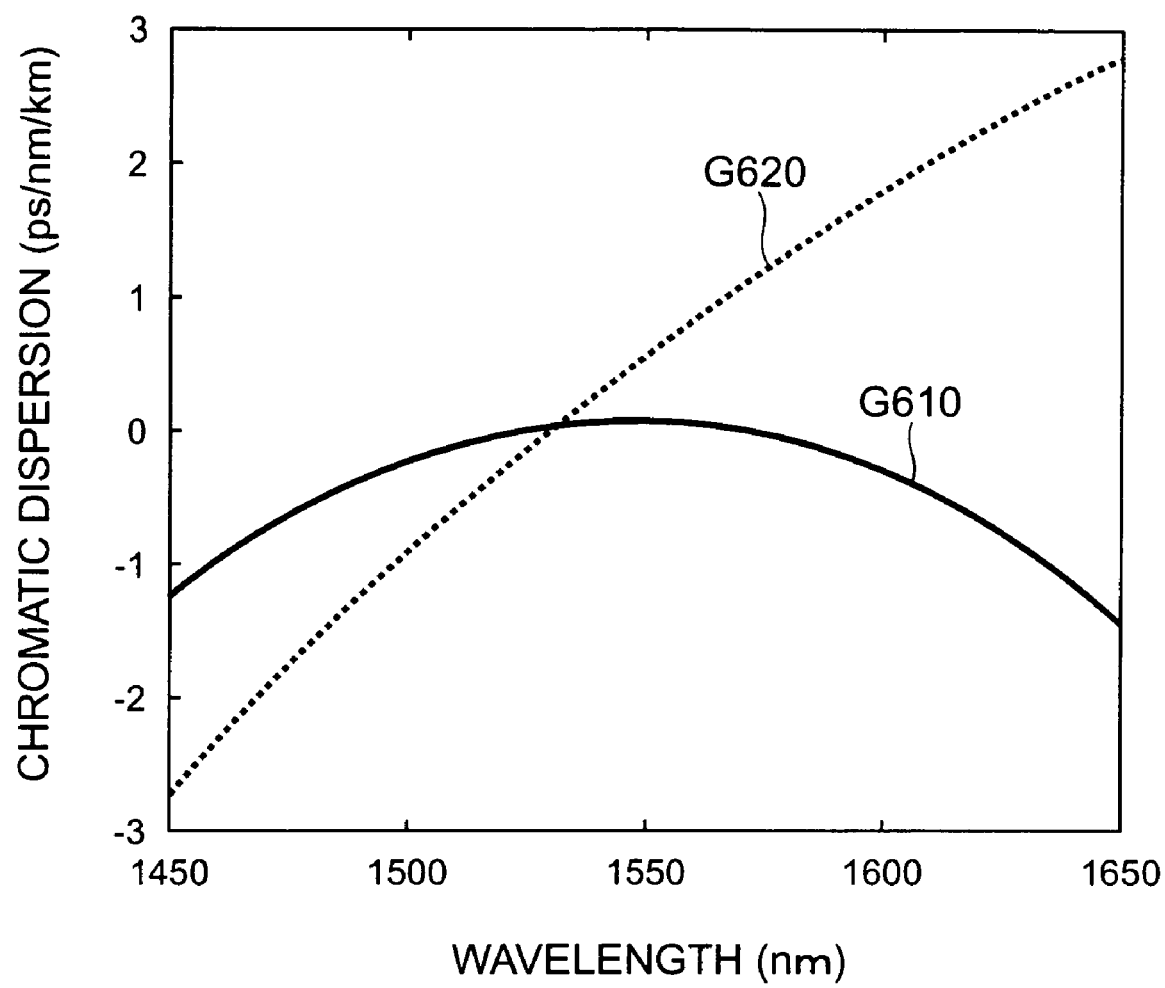
FIG. 6 is a graph showing chromatic dispersion characteristics of the optical fiber of Sample No. 8 (highly nonlinear dispersion-flattened fiber) and the optical fiber of Sample No. 10 (ordinary, highly nonlinear fiber)

FIG. 6 is a graph showing the chromatic dispersion characteristics of the optical fiber of Sample No. 8 (HNL-DFF) and the optical fiber of Sample No. 10 (conventional HNLF). In FIG. 6, graph G610 represents the chromatic dispersion characteristic of HNL-DFF and graph G620 the chromatic dispersion characteristic of HNLF. As seen from this FIG. 6, the HNL-DFF demonstrates the small dispersion slope in a wider wavelength range and is thus able to perform efficient wavelength conversion.

Figure 7:
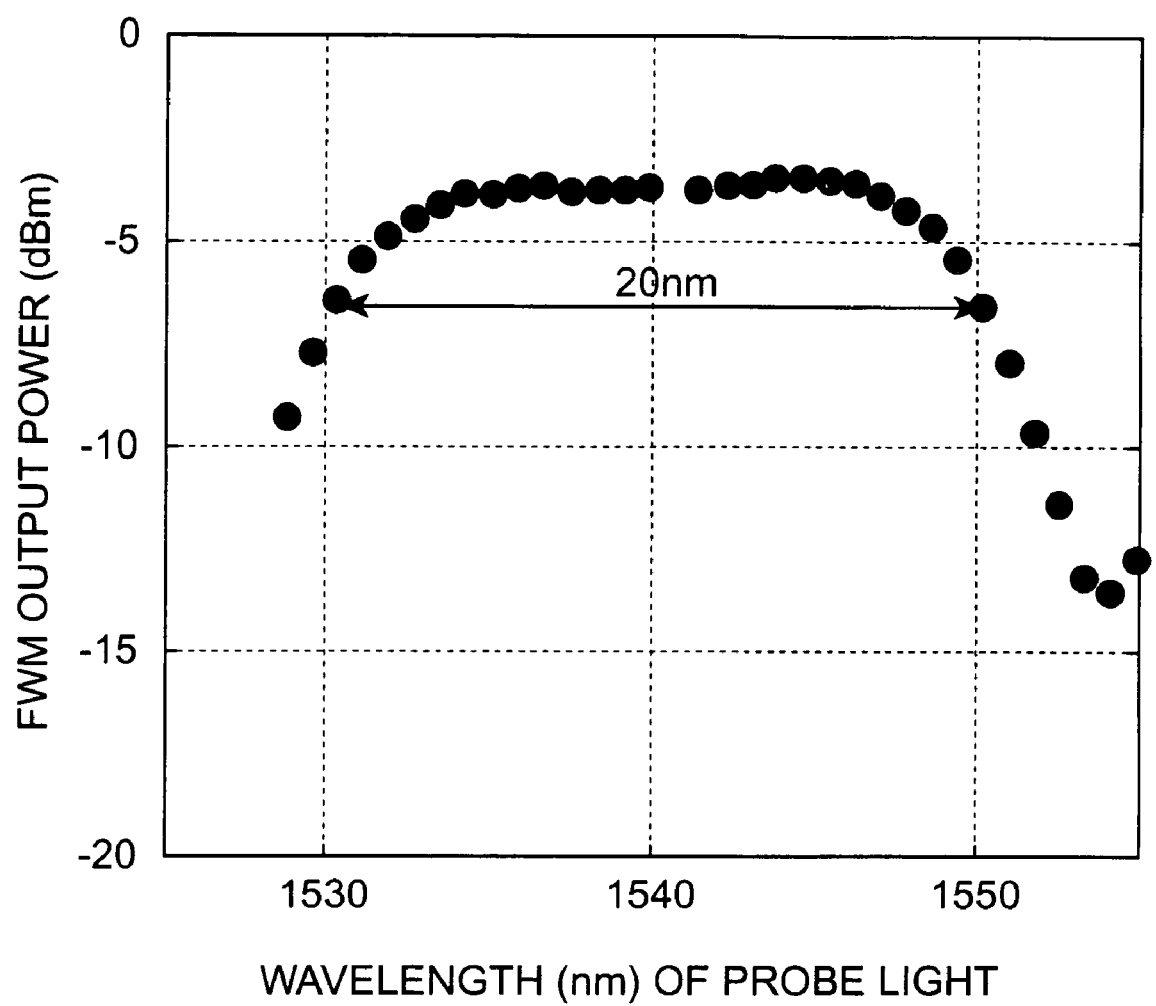
FIG. 7 is a graph showing the measurement result of FWM optical power.

Furthermore, the Inventors measured the optical power of FWM converted light with change in actual wavelength of pumping light in the evaluation system of FIG. 4. FIG. 7 is a graph showing the measurement result of the FWM optical power. The aforementioned HNL-DFF of Sample No. 9 was prepared for this measurement. Then the FWM optical power was measured against wavelength of the probe light under the condition that the wavelength of the pumping light was fixed at 1540 nm and the optical powers of the pumping light and probe light both were 16 dBm.

Figure 8:
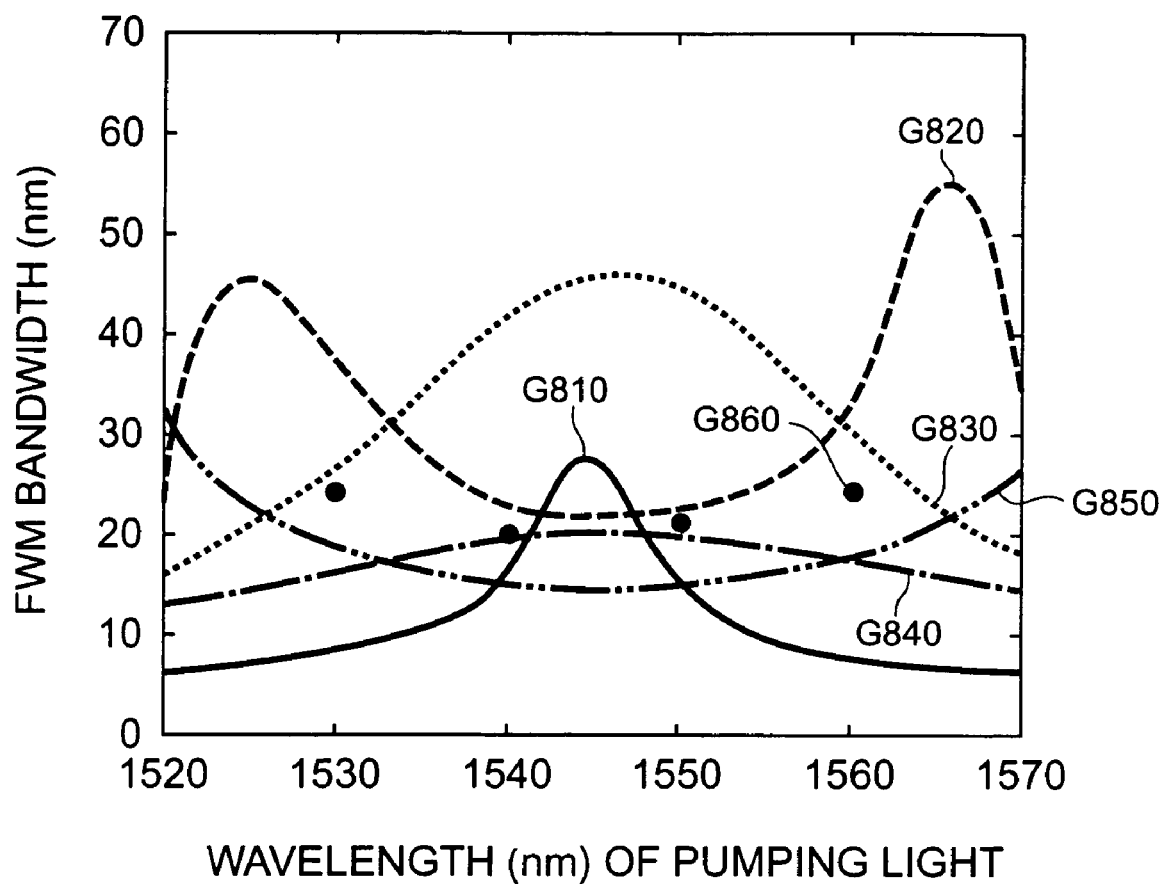
FIG. 8 is a graph showing the results of computer simulations on wavelength dependence of FWM bandwidth with change of chromatic dispersion on the basis of the optical fiber of Sample No. 9 (highly nonlinear dispersion-flattened fiber) while fixing a dispersion curve, the result of computer simulation for the optical fiber of Sample No. 10, and plotted measured values of the optical fiber of Sample No. 9.

In the present specification, an FWM bandwidth is defined as a wavelength band at 3 dB below the peak of the FWM optical power. It is understood in this case that the bandwidth of 20 nm is yielded by the above-stated measurement method (cf. FIG. 7). Graph G860 in FIG. 8 represents the results of plots of this FWM bandwidth against different wavelengths of pumping light. As seen from FIG. 7, the FWM bandwidth of 20 nm can be secured in the wavelength range of 1530 nm to 1565 nm. This means that Detuning of the wavelength of pumping light is 30 nm or more and the application of HNL-DFF can far more expand the wavelength-convertible wavelength band than before. The conversion efficiency is approximately −19 dB, and in the fiber length of 500 m the conversion efficiency obtained is higher than those of the conventional dispersion-flattened fibers and is a practicable value. Accordingly, the nonlinear coefficient γ is preferably 10 (1/W/km) or more.

FIG. 8 is a graph showing the results of computer simulations on wavelength dependence of the FWM bandwidth at the case of shifting the peak of chromatic dispersion while fixing the chromatic dispersion curve shape, on the basis of the optical fiber of Sample No. 9 (HNL-DFF). In this FIG. 8, graph G810 represents the FWM bandwidth against wavelength of pumping light of HNL-DFF as a comparative example, graph G820 the FWM bandwidth against wavelength of pumping light of HNL-DFF having the chromatic dispersion of 0.065 ps/nm/km (the original chromatic dispersion of HNL-DFF of Sample No. 9 at the wavelength of 1545 nm), graph G830 the FWM bandwidth against wavelength of pumping light of HNL-DFF having the chromatic dispersion of 0 ps/nm/km, graph G840 the FWM bandwidth against wavelength of pumping light of HNL-DFF having the chromatic dispersion of −0.065 ps/nm/km, and graph G850 the FWM bandwidth against wavelength of pumping light of HNL-DFF having the chromatic dispersion of +0.13 ps/nm/km. Graph G860 represents the measurement results of plots of the FWM bandwidths against different wavelengths of pumping light, as described above. It is verified from this figure that the application of HNL-DFF to the wavelength converter can avoid sudden narrowing of the FWM bandwidth even with large change in the wavelength of pumping light. As can be clearly seen from the graph G810, the conventional HNLF requires matching of the wavelength of pumping light with the zero-dispersion wavelength and demonstrates a sudden drop of conversion efficiency as the wavelength of pumping light departs from the zero-dispersion wavelength.

The above optical fibers have the transmission loss values much lower than 1 dB/km, as presented in the table shown in FIG. 5. However, the optical fibers suitable for the wavelength converter according to the present invention achieve sufficiently high conversion efficiency in the fiber length of about 1 km (1000 m) even with the transmission loss of 1 dB/km where the nonlinear coefficient γ is 10 (1/W/km) or more; therefore, it is considered that there will arise no practical problem where the transmission loss is 1 dB/km or less.

Concerning Stimulated Brillouin Scattering (SBS), an issue is whether it occurs under practical operation conditions. Conversely, this means that there will arise a problem of a drop of conversion efficiency if the threshold for occurrence with the signal light and pumping light is 10 dBm or less as a practical input condition and that it is thus necessary to use an optical fiber and a pumping light source capable of securing at least the threshold of 10 dBm or more.

Figure 9:
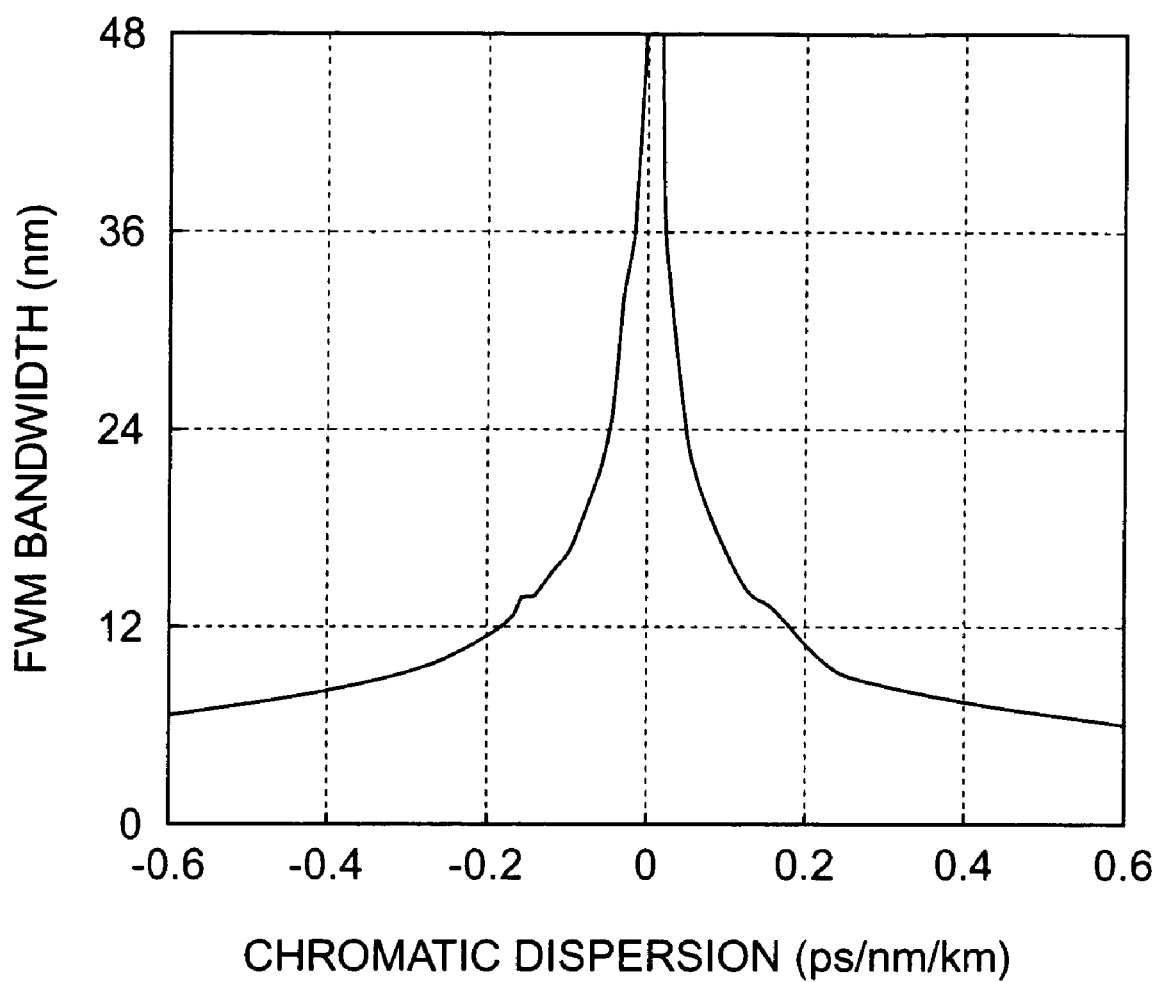
FIG. 9 is a graph showing the relationship between chromatic dispersion and FWM bandwidth.

Furthermore, FIG. 9 is a graph showing the relationship between chromatic dispersion at the pumping light wavelength and FWM bandwidth. In practice, a flexible optical network is believed to be substantialized where the minimum wavelength tunable range is ±6 nm (FWM bandwidth=12 nm). It is apparent from the graph of FIG. 9 that the absolute value of chromatic dispersion necessary for it is within the scope of ±0.2 ps/nm/km. Therefore, in order to implement tunable wavelength conversion throughout the entire range of the C-band (1530 nm–1565 nm), the absolute value of the chromatic dispersion needs to be less than 0.2 ps/nm/km in the wavelength range of 1530 nm to 1565 nm.

Next, optical communication systems to which the wavelength converter according to the present invention is applied will be described. FIGS. 10A–10E are diagrams showing a configuration of a first embodiment of an optical communication system to which the wavelength converter according to the present invention is applied.

In the optical communication system shown in FIG. 10A, there are EDFA 211, DMF 221, optical coupler 231 for guiding light from a branch transmission line into a main line, EDFA 212, DMF 222, tunable attenuator 241 (ATT), EDFA 213, and AWG 250 arranged in order on the main transmission line from optical transmitter (TX) 201 toward optical receiver (RX) 202. Provided on the branch transmission line is wavelength converter 200 (the wavelength converter according to the present invention) which receives pumping light from pumping light source 204 and signal light from optical transmitter (TX) 203 and having passed through EDFA 216 and transmission line fiber 224, and which outputs new converted light of a predetermined wavelength through optical coupler 231 into the main line. This wavelength converter 200 is provided with optical coupler 232 for coupling the pumping light having been outputted from the pumping light source 204 and having passed through EDFA 214 and tunable BPF 261 in order, with the signal light having been outputted from the transmission line fiber 224 and having passed through EDFA 215 and tunable BPF 262 in order, and HNL-DFF 223 is coupled to the output end of this optical coupler 232. Furthermore, tunable BPF 263 and tunable ATT 242 are placed between HNL-DFF 223 and optical coupler 231.

Since FWM is normally the fast phenomenon of femtosecond order, for example, as a method of making the signal light be packetized, the pumping light used for conversion is properly modulated to add its modulation component to resultant converted light. The optical communication system shown in FIG. 10A is constructed on the assumption that the signal light from the branch line is added to the main transmission line, and the signal light propagating on the main line undergoes burst switching; therefore, the system is a so-called time division multiplex system of carrying data from the branch line on idle intervals of time of the signal light propagating on the main line. We conducted experiments to receive TDM (Time Division Multiplexing) signals and check the signal component from the main line and the signal component from the branch line, thereby confirming that excellent optical transmission was implemented. Tunable BPF 263 for removing the pumping light (and input signal light) is provided in the rear stage of the tunable converter 200.

FIG. 10B shows the optical component of the main signal at output end A of EDFA 211 located on the main line, FIG. 10C the optical component of the added signal at output end B of EDFA 215 located on the branch line, FIG. 10D the component of converted light after wavelength conversion at output end C of tunable ATT 242 provided in the rear stage of the wavelength converter 200, and FIG. 10E a composite signal light component at output end D of EDFA 212 located on the main line.

Furthermore, FIGS. 11A–11E are illustrations showing a configuration of a second embodiment of an optical communication system to which the wavelength converter according to the present invention is applied.

Figure 11A:
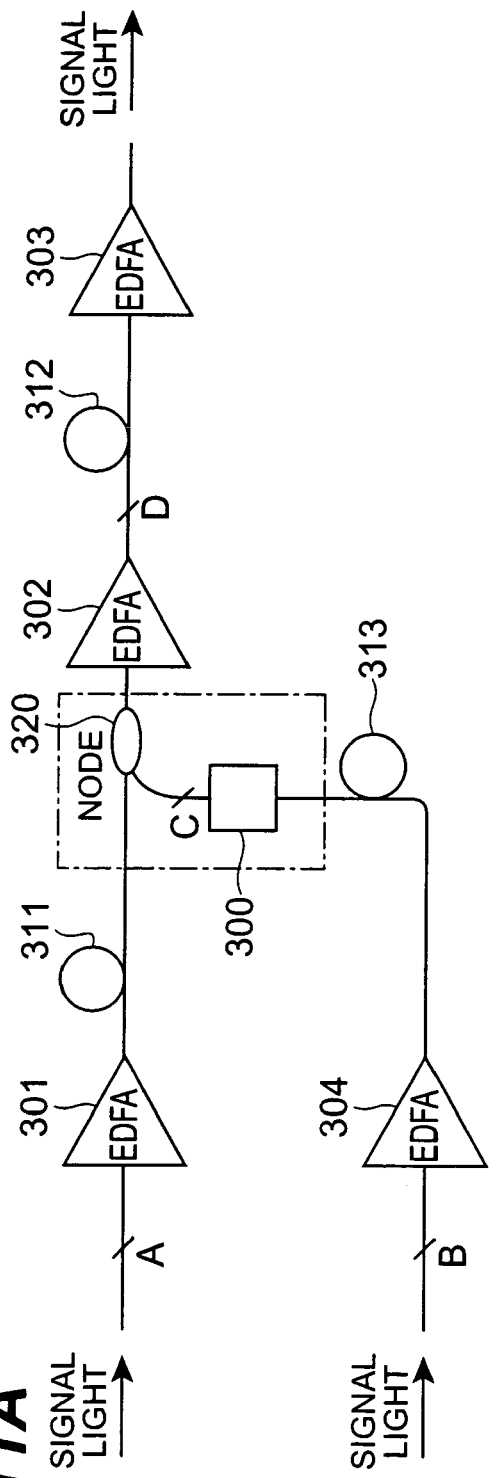
FIGS. 11A to 11E are diagrams showing a configuration of a second embodiment of an optical communication system to which the wavelength converter according to the present invention is applied.

In the optical communication system shown in FIG. 11A, there are EDFA 301, transmission line fiber 311, optical coupler 320 for guiding light from the branch transmission line into the main line, EDFA 302, transmission line fiber 312, and EDFA 303 arranged in order on the main transmission line along the traveling direction of signal light in which multiple channels are multiplexed. Wavelength converter 300 is placed on the branch transmission line, and another signal light is guided through EDFA 304 and transmission line fiber 313 into the wavelength converter 300. Then converted light outputted from this wavelength converter 300 is guided through optical coupler 320 onto the main line.

In the case of the flexible networks, it is expected that the wavelength distribution of WDM (Wavelength Division Multiplexing) signals on the main transmission line varies with time. Therefore, in order to increase efficiency of utilization of each signal channel, the conversion wavelength might have to be properly tuned as to the signal light merging from the branch line, in accordance with vacancy of signal channels on the main line. In this case, the wavelength converter according to the present invention is suitably applicable to the tunable wavelength converter to generate the converted light of a desired wavelength throughout a broad band, which facilitates construction of the optical communication system.

Figure 11B:
Figure 11C:
Figure 11D:
Figure 11E:

FIG. 11B shows WDM signal light at input end A of EDFA 301 located on the main line, FIG. 11C signal light at input end B of EDFA 304 located on the branch line, FIG. 11D converted light after wavelength conversion at output end C of wavelength converter 300, and FIG. 11E WDM signal light at output end D of EDFA 302 located on the main line.

By using HNL-DFF according to the present invention, generation of SC (Supercontinuum) light, optical parametric amplifiers, and so on can be realized.

According to the present invention, as described above, the wavelength converter is substantialized by making use of the highly nonlinear dispersion-flattened fiber with the small dispersion slope for the high-power pumping light, whereby the converted light with high power can be generated even with large Detuning which is the difference between the wavelength of pumping light and the zero-dispersion wavelength of the highly nonlinear dispersion-flattened fiber. Since the optical power of the converted light of the wavelength corresponding to the wavelength of the pumping light is maintained at a sufficient level even with variation in the wavelength of the pumping light within the wavelength band of approximately 35 nm, it is feasible to obtain the tunable wavelength converter implementing the wavelength conversion in a broader band.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wavelength converter for implementing wavelength conversion from input light of a first wavelength by a nonlinear optical phenomenon to generate converted light of a second wavelength different from the first wavelength, said wavelength converter comprising:

an optical fiber having a chromatic dispersion whose absolute value at least in the wavelength range of 1530 nm to 1565 nm is 0.2 ps/nm/km or less and a dispersion slope whose absolute value at a wavelength of 1550 nm is 0.01 ps/nm$^2$/km or less.

2. A wavelength converter according to claim 1, wherein said optical fiber has a nonlinear coefficient of 10 (1/W/km) or more at the wavelength of 1550 nm.

3. A wavelength converter according to claim 1, wherein said optical fiber has a transmission loss of 1 dB/km or less at the wavelength of 1550 nm.

4. A wavelength converter according to claim 1, wherein a threshold for occurrence of Stimulated Brillouin Scattering is, 10 dBm or more, with respect to the pumping light inputted.

5. A wavelength converter according to claim 1, further comprising:

an optical component located on a light output end side of said optical fiber, for blocking the pumping light having propagated through said optical fiber.

6. A wavelength converter for implementing wavelength conversion from input light of a first wavelength by a nonlinear optical phenomenon to generate converted light of a second wavelength different from the first wavelength, said wavelength converter comprising:

an optical fiber having at least two zero-dispersion wavelengths in the wavelength range of 1300 nm to 1700 nm, wherein a threshold for occurrence of Stimulated Brillouin Scattering is 10 dBm or more, with respect to the pumping light inputted.

7. A wavelength converter according to claim 6, wherein said optical fiber has a nonlinear coefficient of 10 (1/W/km) or more at the wavelength of 1550 nm.

8. A wavelength converter according to claim 6, wherein said optical fiber has a transmission loss of 1 dB/km or less at the wavelength of 1550 nm.

9. A wavelength converter according to claim 6, further comprising:

an optical component located on a light output end side of said optical fiber, for blocking the pumping light having propagated through said optical fiber.

10. A wavelength converter for implementing wavelength conversion from pumping light of at least one pumping channel and signal light of at least one signal channel by a nonlinear optical phenomenon to generate converted light of at least one channel, said wavelength converter comprising:

a pumping light source in which a wavelength of the pumping channel is tunable; and an optical fiber having a dispersion slope whose absolute value at the wavelength of the pumping light supplied from the pumping light source is 0.01 ps/nm$^2$/km or less.

11. A wavelength converter according to claim 10, wherein said optical fiber has a nonlinear coefficient of 10 (1/W/km) or more at the wavelength of 1550 nm.

12. A wavelength converter according to claim 10, wherein said optical fiber has a transmission loss of 1 dB/km or less at the wavelength of 1550 nm.

13. A wavelength converter according to claim 10, wherein a threshold for occurrence of Stimulated Brillouin Scattering is 10 dBm or more, with respect to the pumping light inputted.

14. A wavelength converter according to claim 10, wherein a permissive tunable width of the wavelength of the converted light outputted from said optical fiber is 20 nm or more.

15. A wavelength converter according to claim 10, wherein a permissive tunable width of the wavelength of the converted light outputted from said optical fiber is 20 nm or more, with respect to the signal channel at least in the wavelength range of 1530 nm to 1565 nm.

16. A wavelength converter according to claim 10, further comprising:

an optical component located on a light output end side of said optical fiber, for blocking the pumping light having propagated through said optical fiber.

* * * * *